US012647459B2

(12) United States Patent
Trifilo et al.

(10) Patent No.: US 12,647,459 B2
(45) Date of Patent: Jun. 2, 2026

(54) HETEROGENOUS NETWORK DEVICE EXTENSION AND STANDARDIZATION WITH DEVICE INSTRUMENTATION

(71) Applicant: Cisco Technology, Inc., San Jose, CA (US)

(72) Inventors: Giacomo Trifilo, Pully (CH); Domenico Ficara, Essertines-sur-Yverdon (CH); Anirban Karmakar, Ecublens (CH)

(73) Assignee: Cisco Technology, Inc., San Jose, CA (US)

(*) Notice: Subject to any disclaimer, the term of this patent is extended or adjusted under 35 U.S.C. 154(b) by 222 days.

(21) Appl. No.: 18/356,147

(22) Filed: Jul. 20, 2023

(65) Prior Publication Data

US 2025/0030741 A1    Jan. 23, 2025

(51) Int. Cl.
H04L 9/40 (2022.01)

(52) U.S. Cl.
CPC .......... H04L 63/20 (2013.01); H04L 63/0236 (2013.01)

(58) Field of Classification Search
CPC .............................. H04L 63/20; H04L 63/0236
See application file for complete search history.

(56) References Cited

U.S. PATENT DOCUMENTS

| | | | |
|---|---|---|---|
| 10,042,658 B1 | 8/2018 | Day et al. | |
| 2017/0245193 A1* | 8/2017 | Zhang | H04L 5/0055 |
| 2018/0063290 A1* | 3/2018 | Yang | H04L 41/0853 |
| 2019/0108002 A1* | 4/2019 | Minh Le | G06F 8/40 |
| 2020/0120111 A1* | 4/2020 | Gangadharan | H04L 63/0227 |
| 2020/0193017 A1* | 6/2020 | Bannister | G06F 21/554 |
| 2020/0389469 A1 | 12/2020 | Litichever et al. | |
| 2022/0337682 A1 | 10/2022 | Waskiewicz, Jr. et al. | |

FOREIGN PATENT DOCUMENTS

EP          4027239          7/2022

* cited by examiner

*Primary Examiner* — Noura Zoubair
(74) *Attorney, Agent, or Firm* — Polsinelli P.C.

(57) ABSTRACT

Disclosed are systems, apparatuses, methods, and computer-readable media for extending and standardizing heterogeneous network devices using instrumentation. A method includes: receiving, by a client device using a first network interface, instrumentation bytecode to supplement with a data link layer from a management device, wherein a verifier of the client device verifies that the instructions of the bytecode are constrained for security based on a plurality of rules; in response to detecting a trigger at the client device, executing the instrumentation bytecode at the client device to perform at least one function associated with the trigger; and sending a response from the client device based on an execution result of the instrumentation bytecode.

16 Claims, 8 Drawing Sheets

600 ⟶

START

Receive Instrumentation Bytecode To Supplement With A Data Link Layer For A Client Device From A Management Device By A Client Device Using A First Network Interface ⟶ 605

In Response To Detecting A Trigger, Execute The Instrumentation Bytecode At The Client Device To Perform At Least One Function Associated With The Trigger In User Space ⟶ 610

Send A Response From The Client Device Based On An Execution Result Of The Instrumentation Bytecode Based On The Trigger ⟶ 615

END

200

300

Controller
302

AP
304

AP
306

STA
308

Bytecode Message 310

Configure Bytecode 312

Configure Bytecode 314

Connection Setup 316

Execute Bytecode 318

First Report 320

Custom Report 322

Connection Setup 324

Execute Bytecode 326

Second Report 328

Custom Report 330

Legend

Wireless

Conductor

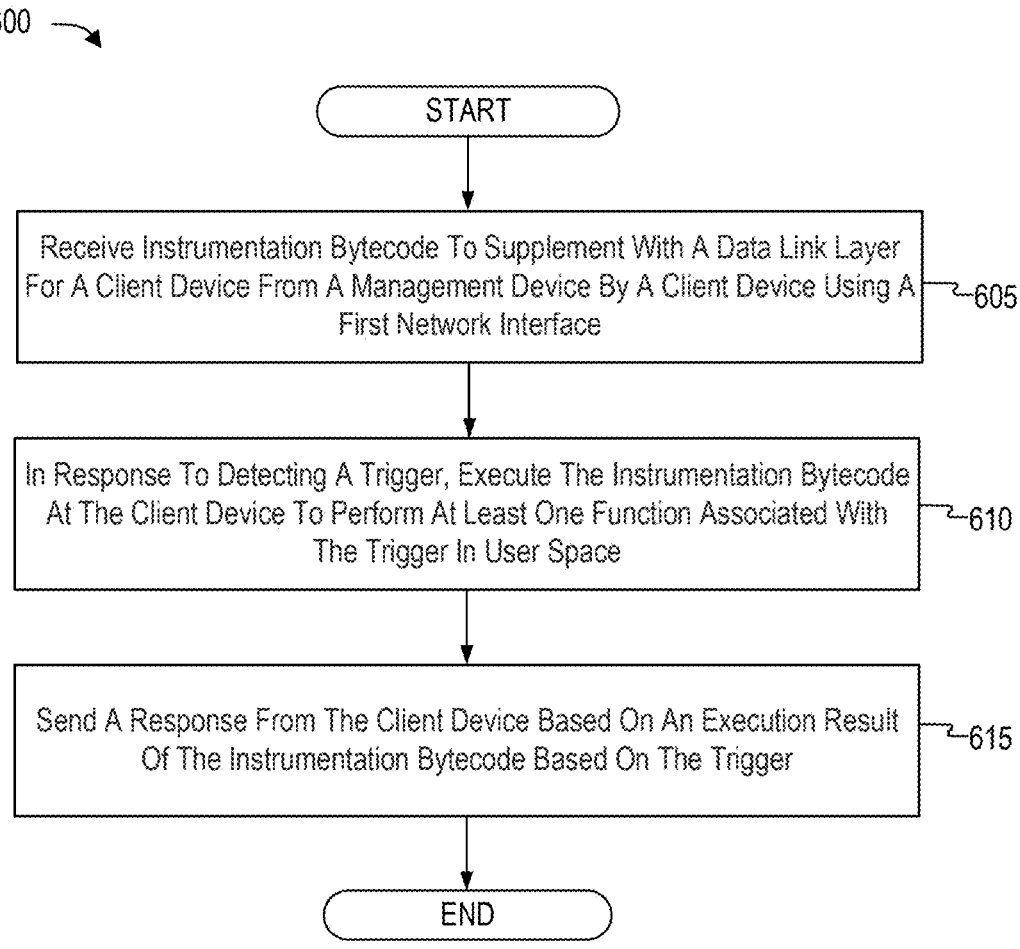

600

START

Receive Instrumentation Bytecode To Supplement With A Data Link Layer For A Client Device From A Management Device By A Client Device Using A First Network Interface ⌐605

In Response To Detecting A Trigger, Execute The Instrumentation Bytecode At The Client Device To Perform At Least One Function Associated With The Trigger In User Space ⌐610

Send A Response From The Client Device Based On An Execution Result Of The Instrumentation Bytecode Based On The Trigger ⌐615

END

FIG. 6

HETEROGENOUS NETWORK DEVICE EXTENSION AND STANDARDIZATION WITH DEVICE INSTRUMENTATION

TECHNICAL FIELD

The disclosure relates generally to communication networks and, more specifically but not exclusively, to systems and techniques to extend and standardize heterogeneous network devices.

DESCRIPTION OF THE RELATED TECHNOLOGY

Embedded device operating systems are specialized operating systems designed to run on small, resource-constrained devices with specific functions and applications. These devices are often found in various industries such as automotive, healthcare, consumer electronics, industrial automation, and more. The operating systems for embedded devices are optimized for efficiency, reliability, and real-time performance, catering to the unique requirements of these devices.

Embedded device operating systems come in various forms, each with its own characteristics and features. Some common types include Real-time operating systems (RTOS) for handling time-sensitive tasks with precise timing requirements, Linux-based operating systems for a general-purpose system, such as networking equipment, set-top boxes, and smart home devices, and bare-metal operating systems that are highly optimized for specific hardware platforms and offer maximum control over system resources.

Embedded device operating systems typically include features such as device drivers, file systems, networking protocols, power management, and security mechanisms. They prioritize efficient resource utilization, minimal memory footprint, and low power consumption. Embedded device operating systems play a crucial role in enabling the functionality and performance of a wide range of embedded devices, contributing to advancements in various industries and improving the user experience among the Internet of Things.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example method for extending and standardizing heterogeneous network devices in accordance with some aspects of the disclosure;

DETAILED DESCRIPTION

Figure 1:
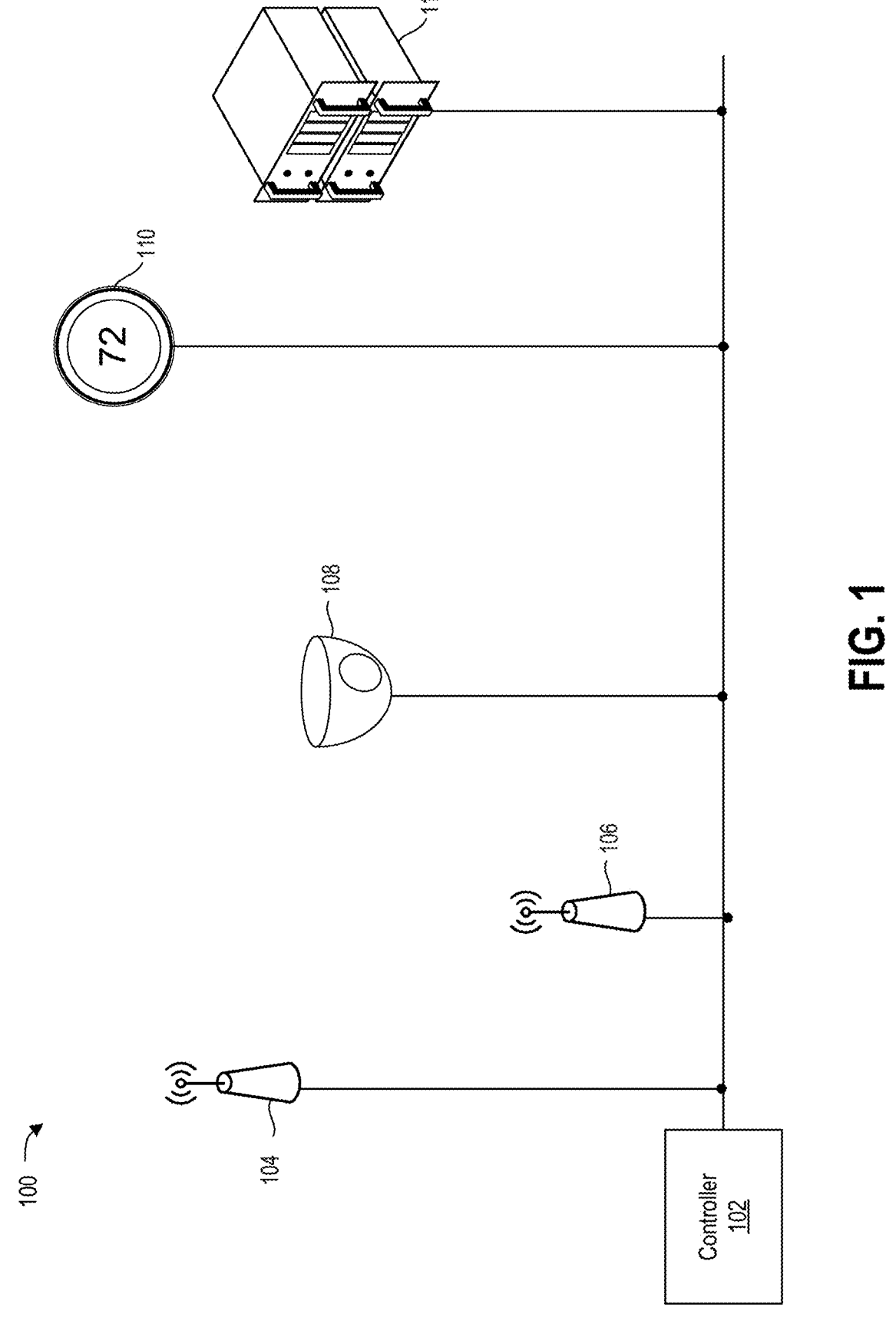
FIG. 1 is a conceptual illustration of a network associated with a modern facility with varying functions in accordance with some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Disclosed are systems, apparatuses, methods, computer readable medium, and circuits for managing a plurality of devices. According to at least one example, a method includes: receiving instrumentation bytecode to supplement with a data link layer for a client device from a management device by a client device using a first network interface, wherein a verifier verifies instructions of the bytecode are constrained for security based on a plurality of rules; in response to detecting a trigger, executing the instrumentation bytecode at the client device to perform at least one function associated with the trigger, and sending a response from the client device based on an execution result of the instrumentation bytecode based on the trigger. For example, the client device receives instrumentation bytecode to supplement with a data link layer for a client device from a management device by a client device using a first network interface, wherein a verifier verifies instructions of the bytecode are constrained for security based on a plurality of rules; in response to detecting a trigger, executes the instrumentation bytecode at the client device to perform at least one function associated with the trigger; and sends a response from the client device based on an execution result of the instrumentation bytecode based on the trigger.

In another example, a client device for managing a plurality of devices is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the client device to: receive instrumentation bytecode to supplement with a data link layer for a client device from a management device by a client device using a first network interface, wherein a verifier verifies instructions of the bytecode are constrained for security based on a plurality of rules; in response to detecting a trigger, execute the instrumentation bytecode at the client device to perform at least one function associated with the trigger; and send a response from the client device based on an execution result of the instrumentation bytecode based on the trigger.

Example Embodiments

In some aspects, different types (or variants) of devices may have varying capabilities and different types of triggers, reports, and other functions. In some aspects, functions associated with a facility or an enterprise will be heterogenous to incorporate all the necessary infrastructure to accommodate a modern facility. For example, modern facilities commonly provide guest network access and may need to provide varying types of security based on the facility. In addition, modern facilities also have different devices, such as legacy wireless access points (APs) that cannot be replaced on a regular interval. The maintenance of these devices can be cumbersome because of the varying devices, different requirements, and so forth. In addition, the monitoring of these devices can be difficult because each device may report an issue (e.g., a port scan) differently, which can complicate maintenance of network security operations.

The number of network devices, as well as the number of functions provided by the network devices, can significantly impact the complexity of infrastructure maintenance and security operations. As the number of device variants increases, the complexity also increases in a non-linear manner because device interoperation can be affected based on updates. Even when a device runs a similar operating system, a vendor may modify logs that are output by the device.

In some aspects, systems and techniques for instrumenting different network devices are disclosed and enable the different network devices to standardize and supplement behavior. In one illustrative aspect, many network devices may run a variant of the Linux operating system and can be instrumented using an enhanced Berkely Packet Filter (eBPF) to add and modify behavior. The aspects described below provide both in-band and out-of-band support to streamline operations, improve accessibility, improve security, and other benefits described below. In other aspects, a device that does not support eBPF can be supplemented with a network protocol extension to add and modify behavior, as further described below.

Examples are described herein in the context of systems and methods for extending and standardizing device behavior. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

FIG. 1 is a conceptual illustration of a network 100 associated with a modern facility with varying functions in accordance with some aspects of the disclosure. In some aspects, the network includes an instrumentation controller 102 that is configured to provide supplemental instrumentation to various network devices of the network 100.

In the aspect illustrated in FIG. 1, the network includes a first wireless AP 104, such as an 802.11-based wireless network router that provides wireless network access, a second wireless AP 106 that supports different functionality or has a different manufacturer, a camera 108 that provides security and monitoring function, such as an Internet of Things (IoT) device such as a connected thermostat which includes proximity sensors and other detection mechanisms, and a plurality of servers 112. The devices illustrated in FIG. 1 are not limiting, and other devices can be included such as connected smart plugs, building automation sensors, security devices, network equipment, wireless repeaters, and other devices that may integrate and connect to devices of the network 100.

In some cases, the devices can have different capabilities in terms of memory, computation power, network communication, and so forth as well as have different operating systems. In one aspect, network-based embedded devices frequently implement a Linux kernel due to the connected features and stability of the system. For example, many APs such as the instrumentation controller 102 and the second wireless AP 106 may implement the Linux kernel and may support eBPF. Other devices may be extended by adding a network extension that implements additional functionality to the network stack (e.g., an open system interconnection (OSI) model having seven layers: physical layer, data link layer, network layer, transport layer, session layer, presentation layer, and an application layer). For example, a network extension may integrate into the data link layer when a device uses a real time operating system (RTOS).

The various devices of the network 100 may need to be extended for additional functionality in some cases. For example, the first wireless AP 104 may be a legacy (e.g., brownfield) device and the second wireless AP 106 may be a greenfield device with additional functionality. Some functions may be supportable within the instrumentation controller 102 based on additional instrumentation, such as a new type of probe to pass messages in a wireless network to improve positioning and location functions.

In other cases, the various devices of the network 100 may be difficult to manage due to different reporting formats, different message types, and so forth. For example, the instrumentation controller 102 may use a plain-text logging function (e.g., raw text with no additional metadata), and the camera 108 may use an encoded form such as a JavaScript object notation (JSON) format to provide additional context. Given the different formats, different triggers, and varying capabilities of the devices of the network 100, monitoring the network 100 can be challenging and complexity of management may scale non-linearly due to interoperation of varying devices, etc. In other aspects, the various devices of the network 100 may also report information in a non-configurable manner, such as the network administrator cannot control the camera 108 to upload images to the servers 112 for example.

Figure 2:
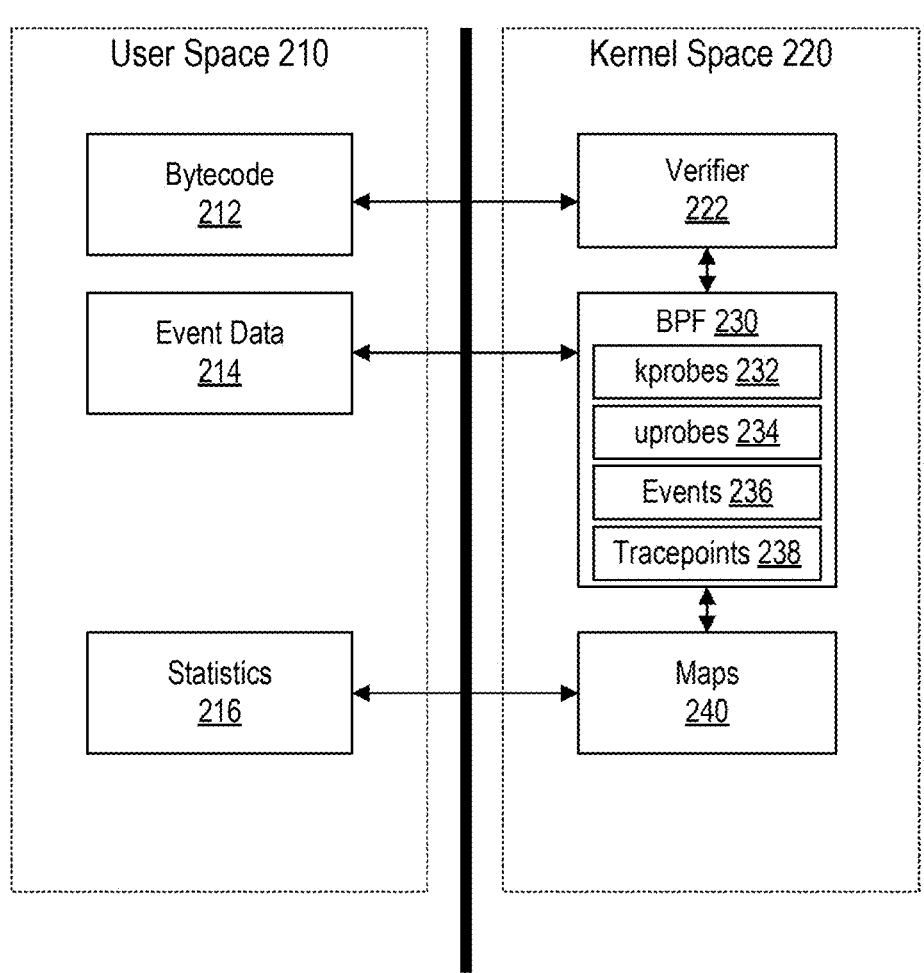
FIG. 2 is a conceptual illustration of a bytecode-based packet filter that can instrument an operating system or an application in accordance with some aspects of the disclosure.

FIG. 2 is a conceptual illustration of a system 200 that implements bytecode-based packet filter to instrument an operating system or an application with additional functionality in accordance with some aspects of the disclosure. Instrumentation bytecode is computer object code that is interpreted into binary machine code to modify various aspects of software systems, such as to measure performance of various aspects of the system or supplement various functions. The system 200 is logically divided into a user space 210 where a user executes various operations, stores application information, and so forth, and a kernel space 220 where system events occur and is restricted for security to prevent malicious actors. In some aspects, bytecode 212 can be loaded into the user space 210, which is then provided to a verifier 222 within the kernel space 220 that analyzes the bytecode 212 for security functions and ensures that the instructions are constrained based on a plurality of rules. For example, in an eBPF filter, the bytecode 212 is analyzed for looping instructions and reverse branches and permits the bytecode 212 to operate based on not including looping instructions and reverse branches. Looping instructions and reverse branches can be used to comprise the security of the system 200 and therefore may be strictly prohibited. The verifier implements a plurality of rules to prevent malicious instructions that could compromise the security of the system 200 (e.g., by gaining root or administrator access).

In the event the verifier 222 validates the bytecode 212, the bytecode 212 is then provided to the eBPF 230 for system modification and instrumentation. In some aspects, the eBPF 230 can configure various triggers to enable supplemental functionality. In one example, the eBPF 230 may analyze a wireless 802.11 packet to determine if the 802.11 packet is a beacon (e.g., an 802.11K beacon), or if a network packet is flood traffic associated with a distributed denial of service (DDOS) attack.

In some aspects, the eBPF 230 executes the bytecode 212 and performs various actions such as measuring latency, summarizing latency as a histogram, analyzing stack traces, network logging functions, sending in-band network data (e.g., on the same network interface that triggers the bytecode 212), sending out-of-band network data (e.g. on a different network interface that triggers the bytecode 212), etc. In one illustrative example, the eBPF 230 may include a just in time (JIT) compiler that converts the bytecode into machine instructions. In some aspects, the bytecode 212 can be attached to different sources such as kprobes 232, uprobes 234, tracepoints 236, and events 238.

The kprobes 232 enable kernel dynamic tracing, the uprobes 234 enable user level dynamic tracing, the tracepoints 236 enable kernel static tracing, and the events 238 enable time sampling and performance metrics. For example, the kprobes 232 can be triggered by network events to enable intrusion detection functions, and the events 238 can be configured to measure latency and system responsiveness, particularly under load.

In some aspects, the eBPF 230 can pass data back to user space as events 214 or maps 240. In some aspects, the maps can generate various statistics 216 within the user space 210 (e.g., network performance, latency, etc.). In some aspects, the maps 240 maps can implement arrays, associative arrays, and histograms, and are suited for passing summary statistics. In other cases, the eBPF 230 can provide instrumentation to provide information to external systems for supplemental reporting, add additional information to a report, etc.

Although an eBPF 230 is described, the functionality described herein can also be added to non-Linux based systems with network protocol extensions. For example, an RTOS may receive a network protocol extension to supplement and standardize network reporting, which can improve intrusion detection and other security functions.

Figure 3:
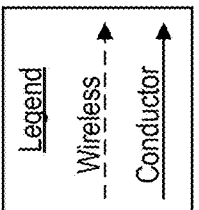
FIG. 3 is a sequence diagram illustrating instrumentation of at least one device of a network in accordance with some aspects of the disclosure.

FIG. 3 is a sequence diagram 300 illustrating instrumentation of at least one device of a network in accordance with some aspects of the disclosure. In one illustrative aspect, the sequence diagram 300 illustrates instrumenting APs within a wireless network based on a controller 302, a first AP 304 (e.g., the first wireless AP 104), a second AP 306 (e.g., the second wireless AP 106), and a wireless station 308 (also referred to as an STA in the 802.11 standards). In particular, the sequence diagram 300 illustrates out-of-band reporting of additional information In one illustrative aspect, the controller 302 sends a bytecode message 310 in response to various triggers, such as a system administrator pushing network-based functionality to an enterprise network. At block 312, the first AP 304 stores and configures the bytecode in the bytecode message 310 and, at block 314, the second AP 306 stores and configures the bytecode.

In one illustrative aspect, the wireless station 308 may enter into an area associated with the first AP 304 and perform a connection setup 316 to enable network access through the first AP 304. In this case, in response to the connection setup 316, the first AP 304 may execute the bytecode at block 218 and trigger multiple responses. In one example, the first AP 304 may send a first report 320 identifying the connection with the wireless station 308, and the first report 320 may be a message having a first format. For example, the first report 320 may be sent to the controller 302 or other suitable system, database, or other storage system using a remote procedure call (RPC). The first AP 304 may also be instrumented to send a custom report 322 that is customized by a system administrator to improve network function. In some aspects, the custom report 322 may be sent to the RPC connection or a different connection such as a representational state transfer (REST) request.

The wireless station 308 may move throughout the space and determine to select the second AP 306 based on a signal strength of the first AP 304 falling below a threshold. In this case, the wireless station 308 and the second AP 306 may perform a connection setup 324 to enable the wireless station 308 to communicate with the network. In this case, the wireless station 308 executes the bytecode at block 326 based on the connection setup 324 and sends a second report 328 and a custom report 330.

In one illustrative aspect, the second report 328 may have a different format, different properties, and generally be different from the first report 320. For example, the second report 328 may be a greenfield AP and may provide additional information, such as frequency band information in a 6 GHz band, which is not supported by the first AP 304. On the other hand, the custom report 322 and the custom report 330 may have the same structure and may be used to directly compare metrics, improve network automation functions, and so forth.

In some aspects, although the sequence diagram 300 illustrates reports sent to the controller 302, the first AP 304 and the second AP 306 may be configured to send the reports to other devices associated with the network. In addition, the various reports are out-of-band because the reports are triggered based on wireless communication and are sent through a different network (e.g., an Ethernet-based network).

Figure 4:
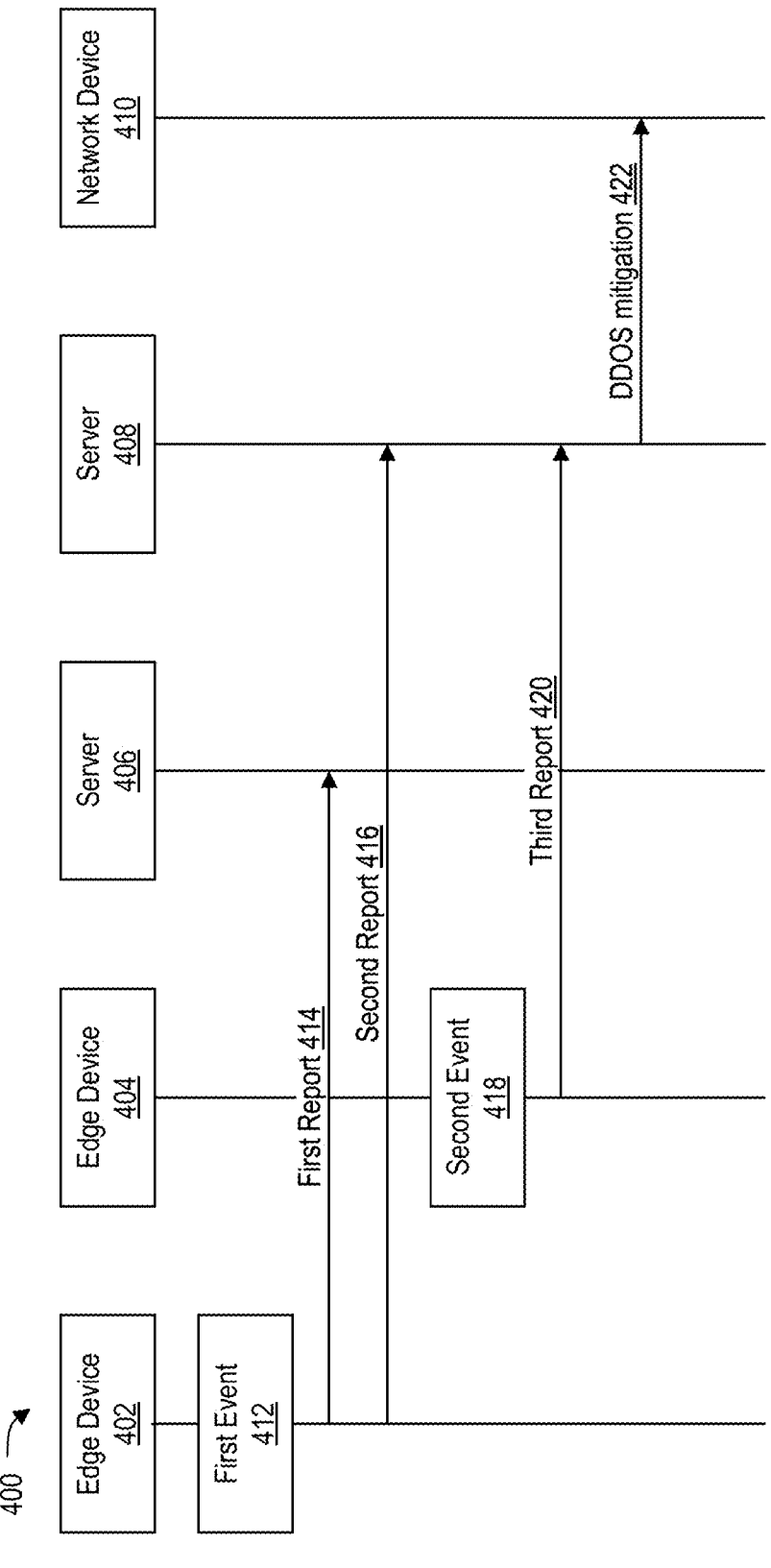
FIG. 4 is a sequence diagram illustrating instrumentation of at least one device of a network in accordance with some aspects of the disclosure.

FIG. 4 is a sequence diagram 400 illustrating instrumentation of at least one device of a network in accordance with some aspects of the disclosure. In one illustrative aspect, the sequence diagram 400 includes a first edge device 402 and a second edge device 404 that are instrumented with bytecode (e.g., similar to FIG. 3) and are configured to selectively provide reports to a first server 406 and a second server 408. A network device 410 may be configured to perform various functions in response to different events.

In the aspect illustrated in FIG. 4, at block 412, the first edge device 402 detects a first event and executes the instrumentation bytecode. The first event can be various events such as a scheduled system event, a condition associated with an application (e.g., a service crash), a security event associated with a service (e.g., an intrusion attempt). In response to the first event at block 412, the first edge device 402 provides a first report 414 to the first server 406 and a second report 416 to the second server 408.

At block 418, the second edge device 404 detects a second event and executes the instrumentation bytecode. As noted above, the event can be any number of network events, but will be further described below to illustrate different aspects of the disclosure. The second edge device 404 sends a third report 420 to the second server 408 in this case. For example, the second event may have a different characteristic that is not reported to the first server 406. In this case, the third report 420 includes information that the second server 408 determines corresponds to a malicious event, such as a network scan of a particular service that can be exploited using various intrusion techniques. For purposes of illustration, the malicious event is presumed to be a DDOS attack to flood network devices and render a network unresponsive. In response to the determination of the malicious event, the second server 408 sends a DDOS mitigation message 422 to the network device 410, which may gate packages having characteristics associated with the second event.

The DDOS mitigation message 422 is merely an example of instrumentation, and separation of functionality across different devices that can improve network performance, standardize responses, supplement messages, and so forth.

Figure 5:
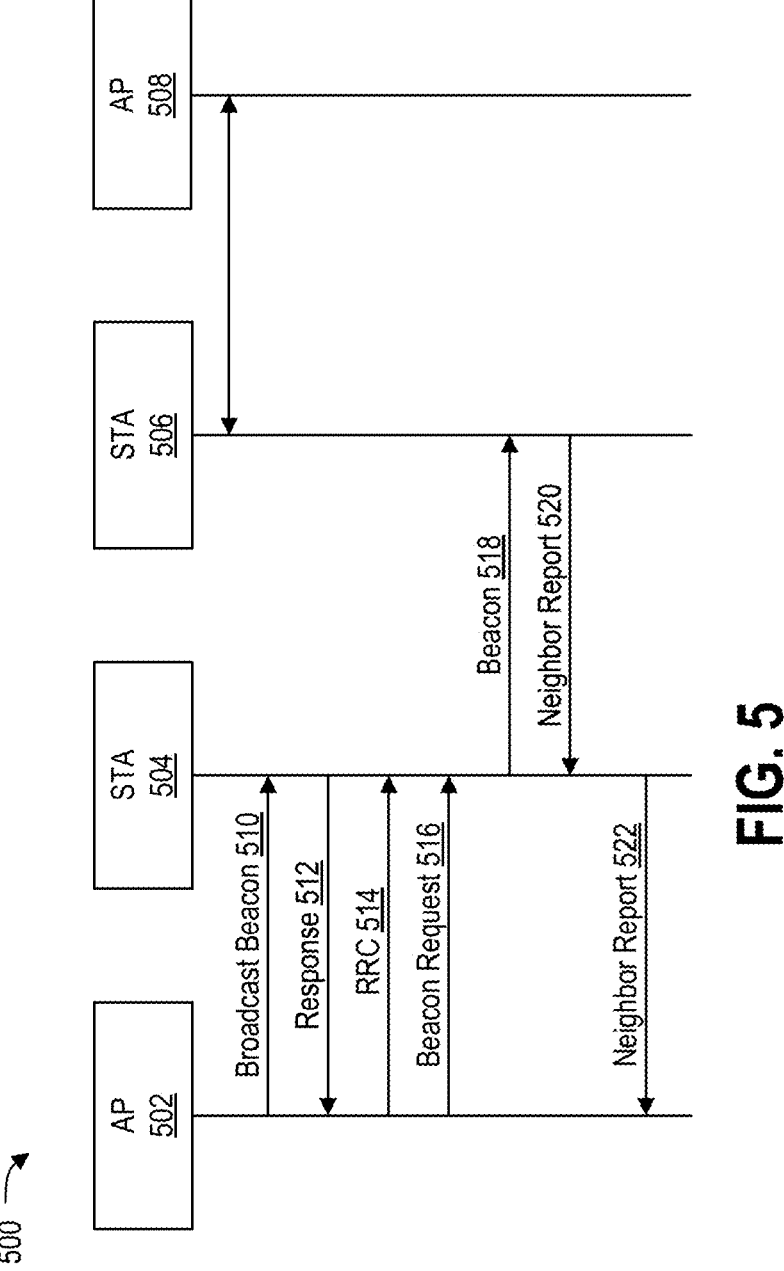
FIG. 5 is a sequence diagram illustrating instrumentation of at least one device of a network in accordance with some aspects of the disclosure.

FIG. 5 is a sequence diagram 500 illustrating instrumentation of at least one device of a network in accordance with some aspects of the disclosure. In some aspects, the functionality of devices can be extended to support features that are not supported in brownfield devices. In one aspect, the sequence diagram 500 illustrates extending a first AP 502 to include functionality supported by the second AP. As an example, in some cases, at higher frequency bands, APs may need to coordinate in the frequency band by identifying APs that are out of communication range to facilitate frequency selection and bandwidth allocation.

In one aspect, the first AP 502 is presumed to be instrumented with additional bytecode related to a greenfield standard that is supported by a second AP 508, as further described below. Initially, the first AP 502 broadcasts a beacon 510 that identifies parameters of the first AP 502 (e.g., supported protocols, etc.) that is received by devices, such as a wireless station 504, within a communication range of the first AP 502. In this case, a second wireless station 506 does not receive the beacon 510 because the second wireless station 506 is outside of the communication range of the first AP 502.

The wireless station 504 sends a response 512 back to the first AP 502 that the wireless station 504 wants to connect. In this case, the first AP 502 sends a radio resource configuration (RRC) 514 message with various parameters. The first AP 502 also sends a beacon request 516 to the wireless station 504 to induce the wireless station 504 to perform neighbor discovery and identify various devices outside of its communication range. In this case, the wireless station 504 broadcasts a beacon 518 (e.g., an 802.11k beacon) that is received by the second wireless station 506 and responds with a neighbor report 520. In this case, the neighbor report 520 can identify the second AP 508 by virtue of being connected with the second wireless station 506. In addition, the second wireless station 506 can receive other neighbor reports, and generate and send a neighbor report 522 to the first AP 502.

In this case, even though the first AP 502 is instrumented with additional bytecode to add functionality, the first AP 502 can add automated frequency control (AFC) functionality to improve coordination with other greenfield devices.

FIG. 6 illustrates an example method for extending and standardizing heterogeneous network devices. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence. Although a computing device is described as performing the method, this example is for descriptive purposes. The method may be performed in a distributed manner using cloud computing, various containers, microservices, and other techniques.

At block 605, the computing system (e.g., the computing system 800) or a device including the computing system (e.g., the first AP 304, the second AP 306, the first edge device 402, the second edge device 404, the first AP 502, etc.) may receive instrumentation bytecode to supplement with a data link layer for a client device from a management device by a client device using a first network interface. For example, the data link layer can be a driver associated with a network interface such as a wireless communication device. In one aspect, a verifier (e.g., the verifier 222) verifies instructions of the bytecode are constrained for security based on a plurality of rules (e.g., no loops, no reverse branches, etc.). The instrumentation bytecode is provided to a plurality of client heterogenous devices that each use a version of an operating system version that support the instrumentation bytecode. For example, the instrumentation bytecode may be provided to different devices that execute different builds of a Linux kernel. The instrumentation bytecode includes a packet filter that is executed in the kernel based on limitations associated with the user space. For example, the user space cannot access the data link layer directly to supplement existing messages.

At block 610, the computing system may, in response to detecting a trigger, execute the instrumentation bytecode at the client device to perform at least one function associated with the trigger in user space. In some cases, the trigger can occur in kernel space as well.

In one example of block 610, the executing the instrumentation bytecode comprises adding at least one field to the response. For example, a report, log, message, or other communication can be supplemented. In this case, the response is generated based on an executable function and the executable function does not support the at least one field. The bytecode in this case provides in-band reporting and appends data to a frame, packet, or other communication medium. In some cases, the in-band reporting may be a local log stored on the computing system. The executable function can be various operations related to the device, such as providing a report, sending a warning related to intrusion detection, identifying a status of a service, detecting a service level falls below a threshold associated with a service level agreement, etc.

In another example of block 610, the computing system may generate the response based on the trigger. In this case, the response is sent to a reporting device using a second network interface, which is different. For example, this example is related to out-of-band reporting.

In another example of block 610, the computing system may add new functionality not supported by the device. For example, the response is associated with a supplemental function to be supported by the client device, wherein the supplemental function is associated with a greenfield protocol that is not supported by the client device. As described above, an older AP (e.g., 802.11n) can be supplemented to support modern services, such as adding AFC. In one example, the response is sent using a second network interface associated with wireless communication and enables the second network interface to partially support the greenfield protocol.

In some cases, the triggers can be scheduled events. For example, the trigger comprises a timer or a time to provide the response to an external device, wherein the response includes data pertinent to a state of the client device.

At block 615, the computing system may send a response from the client device based on an execution result of the instrumentation bytecode based on the trigger. In some aspects, the response instructs another device to perform a function directly associated with the trigger. For example, the trigger may be DDOS events and a network device is activated to filter DDOS traffic. In another example, the response is sent to an external device for recordation. For example, the response is related to standardizing responses from different devices. In another example, the response comprises a traceroute function that is executed to identify a route to a sending device.

Figure 7:
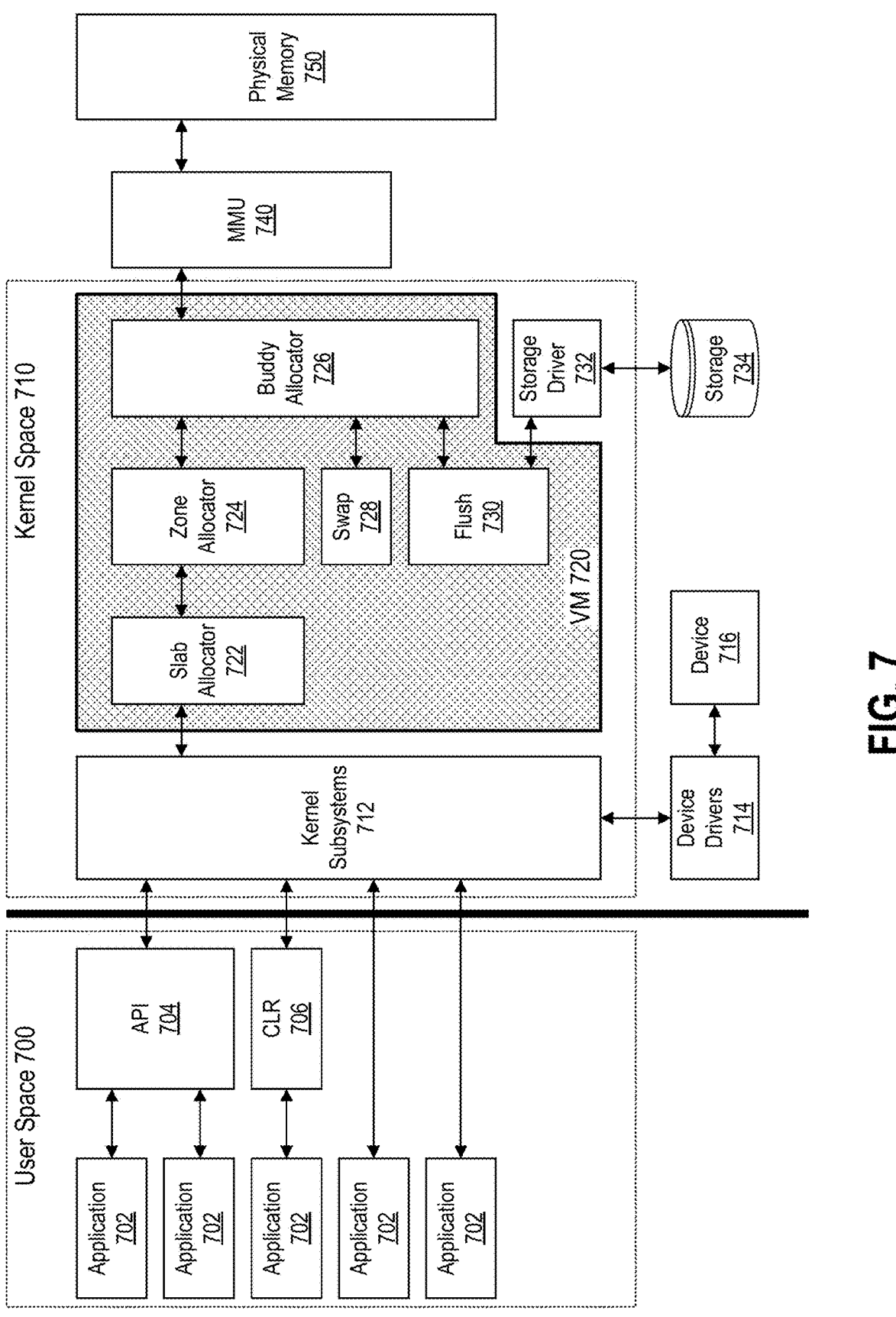
FIG. 7 illustrates a block diagram of memory space of an operating system in accordance with some examples of the disclosure.

FIG. 7 illustrates a logical diagram of memory space of an operating system (OS) in accordance with an embodiment. In particular, FIG. 7 illustrates that a user space 700 and a kernel space 710 are separated by a logical barrier to isolate application and system resources for security purposes and system purposes. Specifically, FIG. 7 illustrates data from the user space 700 and a kernel space 710 are mapped into the physical memory 750. The physical memory can be implemented by any suitable random access memory (RAM) such as static RAM (SRAM) or synchronous dynamic RAM (SDRAM).

A modern operating system can implement a virtual memory that collects and manage memory from a collection of memory devices (e.g., non-volatile hard disk or other non-RAM storage media to provide additional program memory) to create a virtual memory, a protected memory, and a shared memory. A virtual memory is a collection of all memories, a protected memory provides exclusive access to a region of memory that is allocated to a process, and a shared memory provides cooperative access to a region that is shared by multiple processes.

Memory is configured in distinct units and can vary based on the type of memory. For example, a hard disc allocates blocks in 512 bytes intervals and a Linux kernel allocates a page of memory in 4096 byte intervals.

In the example illustrated in FIG. 7, a plurality of applications 702 that execute within the user space 700 and may call an application programming interface (API) 704 or may use a common language runtime (CLR) 706 (e.g., java, C#, webassembly) to access kernel subsystem 712 in the kernel space. The API 704 of the CLR 706 can implement logic to manage the heap, which is a dynamically sized memory that changes during runtime (e.g., as the application executes).

For example, an application 702 written in C # may use the CLR 706 to perform a network request to another device. The application 702 itself includes instructions that are executed by the CLR 706 or API 704 to interact with the kernel subsystem 712. In this case, the API 704 or the CLR 706 manage the heap of the application.

The kernel subsystem 712 also provides access to hardware devices. For example, in the C# example application describe above, the application 702 includes instructions for the CLR 706 to execute a network request. In this case, the CLR 706 generates and provides the request to the kernel subsystems 712, which provides suitable instructions to a device driver 714 to perform the network request using the device 716. For example, the device 716 could be a network interface to execute a hypertext protocol (HTTP) get request for specific data (e.g., a request to retrieve a web page).

In some cases, an application 702 may implement its own heap management functions and directly interact with the kernel subsystems 712 without the API 704 or the CLR 706. Although not illustrated, such an application 702 may operate with an API 704 on a selective basis to perform some functions (e.g., interaction with devices 716) but omit other aspects (e.g., heap management).

The kernel subsystem 712 uses the VM 720 to handle management of the physical memory 750 and perform access (e.g., read/write) functions. The VM 720 comprises a slab allocator 722, a zone allocator 724, and a buddy allocator 726 for controlling memory allocation and access.

The buddy allocator 726 allocates physically contiguous blocks of memory within the entire system. Specifically, the buddy allocator 726 allocates pages and maps each page into a memory management unit (MMU) 740 that performs the read and write operations in the physical memory 750. The buddy allocator 726 receives a memory request and maps the request to a valid physical address range for the MMU 740. The buddy allocator 726 receives a request for a memory allocation and thereby allocates pages of memory. The buddy allocator 726 prefers to allocate contiguous portions of memory for applications. In some hardware configurations, the MMU 740 may not be present and may be implemented by a software module.

The zone allocator 724 is used to allocate pages in different zones that are designed by the OS. For example, zones can include a direct memory access (DMA) zone, a normal zone, and a high memory zone. The DMA zone is provided for direct memory operations of legacy devices. The normal zone includes memory addresses used by the kernel for internal data structures as well as other system and user space allocations. The high memory zone is used for allocation of system resources (e.g., file system buffers, user space allocations, etc.).

The slab allocator 722 can provide finer control by creating pages and segmenting the pages into caches that are initialized by the zone allocator 724. In some examples, the slab allocator 722 creates different caches for each object type (e.g., inode_cache, dentry_cache, buffer_head, vm_area_struct) for storing each object in the corresponding cache.

The VM 720 may also include a swap 728 and a flush 730 that are used for maintaining the swap, which is conventionally used to handle memory addressing when the physical memory 750 becomes largely or fully utilized. The flush 730 may interact with a storage driver 732, which stores swap content in a non-volatile storage 734.

The kernel space 710 is controlled and only accessible to the kernel because it provides all mechanisms to access the physical memory 750 and storage 734. The various applications 702 store data within the user space 700. The user space 700 and kernel space 710 are separated to isolate separate concerns and provide a security barrier to prevent applications from intentionally or unintentionally writing in the kernel space 710. For example, in the example of the network request, the C# application is not concerned about the implementation details of the network request (e.g., a WebSockets request) and is concerned about whether the request is successful or not. Therefore, the user space 700 contains the application information for the network request and the kernel space 710 stores information required to implement that network request.

The kernel space 710 implements security precautions and attempts to prevent access by applications to prevent intentional and unintentional malicious memory access from occurring. For example, the kernel space 710 may attempt to prevent a row hammer attack, which is a repeated bit-flipping of a row of memory addresses to attempt to cause neighboring bits to unintentionally flip values due to electromagnetic effects of repeated bit flipping. Row hammer attacks can be used to escalate user privileges so that a malicious entity can access the kernel space 710.

The VM 720 is an example of a memory management system that manages the physical memory and separates application content in the user space 700 and system content in the kernel space 710. Another OS may implement a memory management subsystem differently but use similar concepts to provide a layer of system security to prevent applications 702 from being able to access the kernel space 710.

In some instances, the processor and/or the system itself may include additional devices to provide additional layers of security. For example, the processor, which is not illustrated in FIG. 7, may include a secure register that is not available for general use and has security precautions. For example, a processor may include a secure configuration register (SCR) that can be programmed during a boot sequence with a security score. A specific hardware component may be configured to calculate the security score during the boot sequence and store that score in the SCR.

Figure 8:
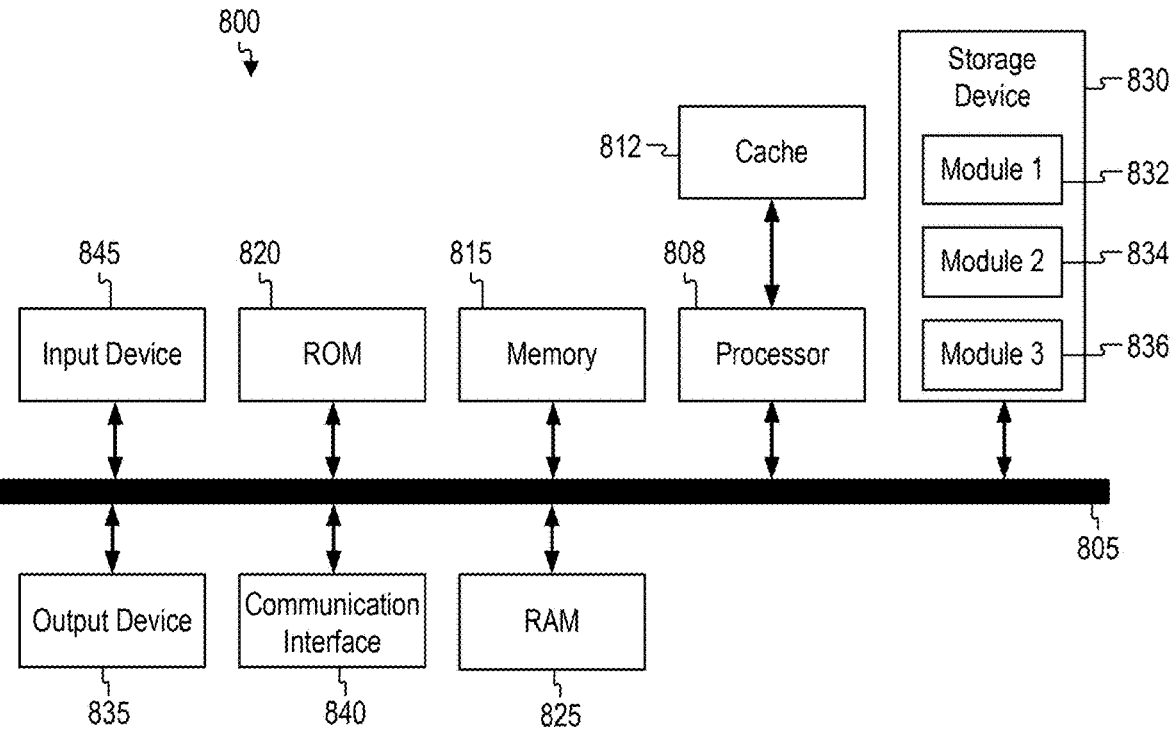
FIG. 8 shows an example of a system for implementing certain aspects of the present technology.

FIG. 8 shows an example of computing system 800, which can be for example any computing device making up the controller 302, the first AP 304, the first edge device 402, the second edge device 404, and other devices described herein, or any component thereof in which the components of the system are in communication with each other using connection 805. Connection 805 can be a physical connection via a bus, or a direct connection to processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a client device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method for managing a plurality of devices, the method comprising:

receiving, by an access point and from a management device using a first network interface of the access point, instrumentation bytecode to supplement with a data link layer, wherein the data link layer is a driver associated with a different network interface of the access point for communication with a plurality of heterogenous client devices, and a verifier of the access point verifies that instructions of the instrumentation bytecode are constrained for security based on a plurality of rules to prevent malicious instructions;

in response to determining by the verifier that the instrumentation bytecode is valid and in response to detecting a trigger at the access point, executing the instrumentation bytecode to obtain one or more performance metrics from one or more end devices connected to the access point, and sending a response indicative of the one or more performance metrics from the access point and to the management device based on an execution result of the instrumentation bytecode, wherein the instrumentation bytecode is provided to the plurality of heterogenous client devices, the plurality of heterogeneous client devices including the access point, at least one other client device uses a different build of an operating system that is used by the access point, the at least one other client device and the access point are configured to execute the instrumentation bytecode, and the instrumentation bytecode includes a packet filter that is executed in a kernel space of the plurality of heterogeneous devices based on limitations preventing a user space of the plurality of heterogeneous devices from accessing the data link layer.

2. The method of claim 1, wherein executing the instrumentation bytecode comprises:

generating the response based on an executable function invoked by the trigger; and adding at least one field to the response based on the instrumentation bytecode.

3. The method of claim 1, wherein executing the instrumentation bytecode comprises:

generating the response based on the trigger, wherein the response is sent to the management device using a second network interface of the access point.

4. The method of claim 1, wherein the response is generated based on instructions within the instrumentation bytecode.

5. The method of claim 4, wherein the response is associated with a greenfield protocol that is unsupported by the access point.

6. The method of claim 1, wherein the trigger comprises a timer or a time to provide the response to the management device.

7. The method of claim 1, wherein the response is sent to the management device to perform a function directly related to the trigger.

8. The method of claim 1, wherein the response is sent to the management device for recordation.

9. The method of claim 1, wherein the response comprises a traceroute function that is executed to identify a route to a sending device.

10. An access point, comprising:

a storage configured to store instructions;

a first network interface;

a processor configured to execute the instructions and cause the processor to:

receive, from a management device and using the first network interface of the access point, instrumentation bytecode to supplement with a data link layer, wherein the data link layer is a driver associated with a different network interface of the access point for communication with a plurality of heterogenous client devices, and a verifier of the access point verifies that the instructions of the instrumentation bytecode are constrained for security based on a plurality of rules to prevent malicious instructions;

in response to determining by the verifier that the instrumentation bytecode is valid and in response to detecting a trigger, execute the instrumentation bytecode to obtain one or more performance metrics from one or more end devices connected to the access point; and send a response indicative of the one or more performance metrics to the management device based on an execution result of the instrumentation bytecode, wherein the instrumentation bytecode is provided to the plurality of heterogenous client devices, the plurality of heterogeneous client devices including the access point, at least one other client device uses a different build of an operating system that is used by the access point, the at least one other client device and the access point are configured to execute the instrumentation bytecode, and the instrumentation bytecode includes a packet filter that is executed in a kernel space of the plurality of heterogeneous devices based on limitations preventing a user space of the plurality of heterogeneous devices from accessing the data link layer.

11. The access point of claim 10, wherein the processor is configured to execute the instructions and cause the processor to:

generate the response based on an executable function invoked by the trigger; and add at least one field to the response based on the instrumentation bytecode.

12. The access point of claim 10, wherein the processor is configured to execute the instructions and cause the processor to:

generate the response based on the trigger, wherein the response is sent to the management device using a second network interface.

13. The access point of claim 10, wherein the response is generated based on instructions within the instrumentation bytecode.

14. The access point of claim 13, wherein the response is associated with a greenfield protocol that is unsupported by the access point.

15. The access point of claim 10, wherein the trigger comprises a timer or a time to provide the response to the management device.

16. The access point of claim 10, wherein the response is sent to a management device to perform a function directly related to the trigger.

\* \* \* \* \*